W. ACHTMEYER.
COVERING.
APPLICATION FILED OCT. 18, 1918.

1,303,224.

Patented May 13, 1919.
2 SHEETS—SHEET 1.

WITNESSES
Frank C. Palmer

INVENTOR
WILLIAM ACHTMEYER.
BY Munn & C.
ATTORNEYS

W. ACHTMEYER.
COVERING.
APPLICATION FILED OCT. 18, 1918.
1,303,224.
Patented May 13, 1919.
2 SHEETS—SHEET 2.
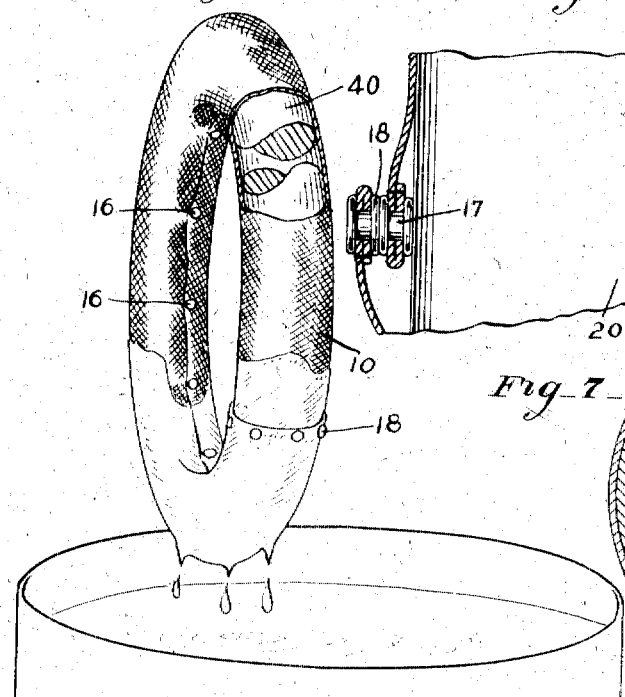
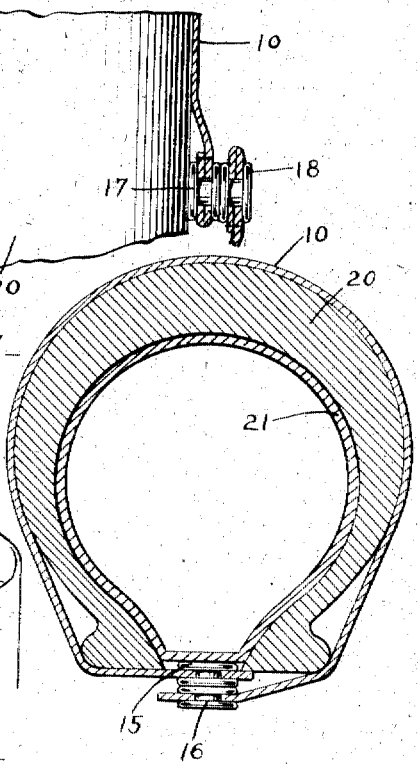
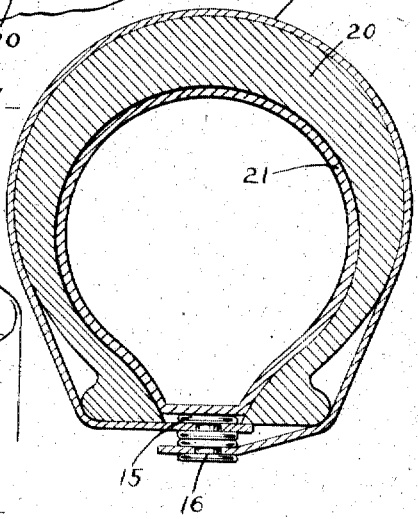
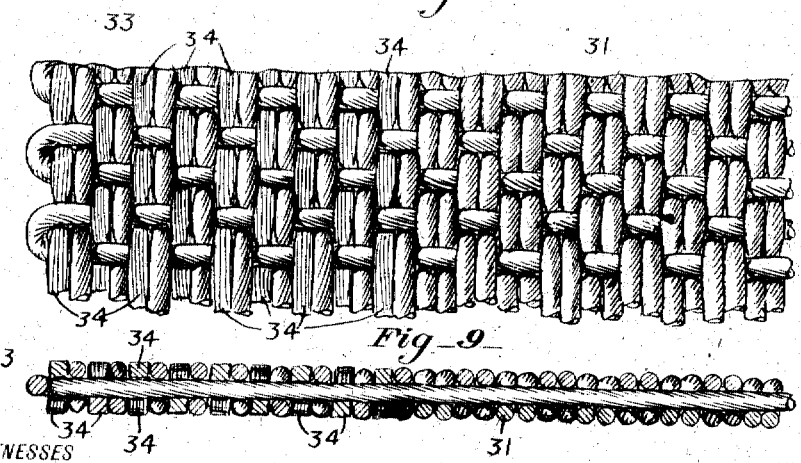
WITNESSES
Frank C. Palmer
Rev. G. Hooker
INVENTOR
WILLIAM ACHTMEYER
BY Munn & C
ATTORNEYS

UNITED STATES PATENT OFFICE.

WILLIAM ACHTMEYER, OF MIDDLETOWN, CONNECTICUT, ASSIGNOR TO THE RUSSELL MANUFACTURING CO., OF MIDDLETOWN, CONNECTICUT, A CORPORATION OF CONNECTICUT.

COVERING.

1,303,224.   Specification of Letters Patent.   Patented May 13, 1919.

Application filed October 18, 1918. Serial No. 258,675.

*To all whom it may concern:*

Be it known that I, WILLIAM ACHTMEYER, a subject of the Emperor of Germany, having declared my intentions to become a citizen of the United States, and a resident of Middletown, in the county of Middlesex and State of Connecticut, have invented a new and Improved Covering, of which the following is a full, clear, and exact description.

The object of the invention is to provide a new and improved covering more especially designed for inclosing and protecting extra tires, such as are usually carried by automobiles and other vehicles. Another object is to provide a covering made of a single woven fabric rendered moisture-proof and fashioned to snugly fit the tire. Another object is to provide a covering which can be readily placed in position on the tire or removed therefrom whenever it is desired to use such tire, the removed covering being capable of being folded up flat to take up very little room for storing or other purposes.

With these and other objects in view the invention consists of certain novel features of construction as hereinafter shown and described and then specifically pointed out in the claims.

A practical embodiment of the invention is represented in the accompanying drawings forming a part of this specification, in which similar characters of reference indicate corresponding parts in all the views.

Fig. 5 is a perspective view of the covering in position on a fashioning block and after being partly dipped into a waterproofing solution, part of the covering being shown broken out;

Fig. 6 is an enlarged cross section of the covering at the overlapping ends;

Fig. 7 is a cross section of the covering in position on the tire;

Fig. 8 is an enlarged face view of a portion of the weave; and

Fig. 9 is a cross section of the same.

Figure 1:
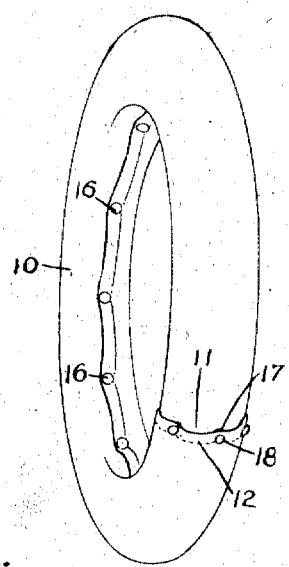
Figure 1 is a perspective view of the covering in use.
Figure 2:
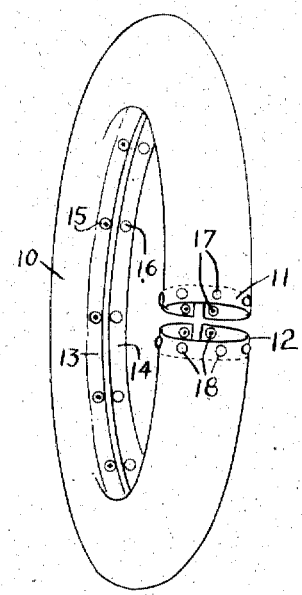
Fig. 2 is a similar view of the same partly opened up and the tire removed.
Figure 3:
Fig. 3 is a face view of the weave from which the coverings are made.

The covering comprises a tubular body 10 of circular shape open along the inner face and having separable ends 11 and 12 to permit of conveniently placing a tire of the usual shoe 20 and inner tube 21 type (see Fig. 7) in position in the covering or removing the latter from such tire. The inner face of the covering 10 is provided with two selvage edges 13 and 14 provided with fastening members 15 and 16, preferably of the stud and socket type, to permit of fastening the selvage edges 13 and 14 together in overlapping relation after the covering is in position on the tire. The ends 11 and 12 of the covering are provided with fastening devices 17 and 18 likewise preferably of the stud and socket type to permit of fastening the ends 11 and 12 together in overlapping relation. It will be noticed that when the ends 11 and 12 and the edges 13 and 14 are fastened together as above described and shown in Fig. 1 then the tire is completely incased in the covering.

Figure 4:
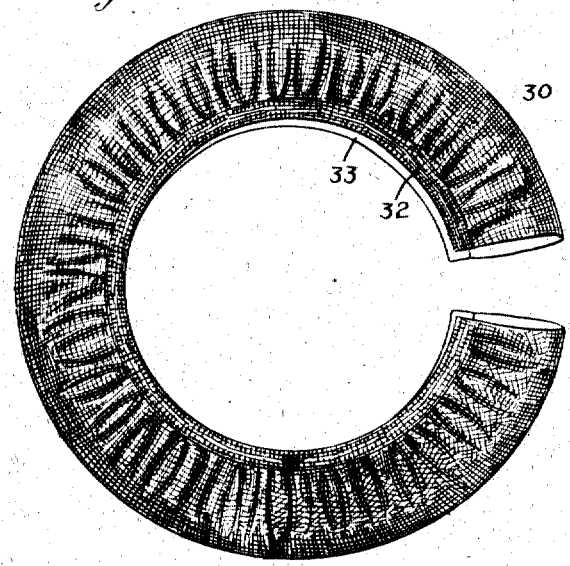
Fig. 4 is a plan view of the covering blank cut from the weave.

The body 10 of the covering is made from a single blank or piece 30 of woven textile material cut from a weave 31 woven flat in a suitable loom, the selvages 32, 33 containing auxiliary or supplemental elastic warp threads 34 (see Figs. 8 and 9) held stretched during the weaving operation. The piece 30 after being cut from the weave 31 is doubled up longitudinally and as the elastic warp threads 32 are now relaxed they draw the weave portions adjacent the selvages 32 and 33 into a puckered condition thereby drawing the piece 30 into circular form, as indicated in Fig. 4. The selvages 32 and 33 form the edges 13 and 14 of the covering. The piece 30 is provided at its ends 11 and 12 and at the edges 13 and 14 with the fastening devices and then the piece is placed around a circular core or block 40 (see Fig. 5) after which the fastening devices 15, 16 and 17, 18 are closed. The covering when placed in position on the core 40 is sufficiently stretched to take out the puckering at the portions adjacent the selvages 32 and 33 whereby the covering is rendered tubular throughout its length. The covering with the core 40 therein is now dipped into a waterproofing solution, preferably one that has gun-cotton as a base, but I do not limit myself to any particular waterproofing solution. This waterproofing solution renders the covering waterproof thus thoroughly protecting the tire subsequently inclosed in the covering when the latter is used. It will also be noticed that the waterproofing material is of such a nature that it sets the fibers of the cotton threads, of which the weave is preferably made, and it also renders the auxiliary elastic warp threads 34 inactive by holding the same against stretching thereby maintaining the covering in the shape given to it on inclosing the core 40 in the said covering. After the waterproofing material has set and dried the fastening devices 15, 16 and 17, 18 are disconnected and then the core 40 is removed. The covering is now in condition for receiving the vehicle tire or other similar circular article.

From the foregoing it will be seen that the body 10 of the covering is made from a single piece of woven fabric rendered moisture-proof and fashioned to snugly fit the tire. It will also be noticed that a tire can be readily placed in position in the covering or removed therefrom whenever it is desired to use such tire, the covering then being capable of being folded up flat to take up very little room for storing or other purposes.

Having thus described my invention, I claim as new and desire to secure by Letters Patent:

1. A covering for tires and other circular articles, comprising a tubular body of circular shape and formed of a single woven piece of fabric doubled up and provided with means to resist puckering at such doubled up portion and having elastic auxiliary warp threads at the side selvages drawing the body into circular shape over a form, means rendering the said body waterproof and setting the said elastic auxiliary warp threads, fastening devices at the ends of the body to fasten the ends together in overlapping relation, and fastening devices to fasten the selvage edges together.

2. A covering for tires and other circular articles, comprising a tubular textile body of circular shape, open along the inner face and having its ends adapted to overlap, the said body being formed of a single piece of a flat woven fabric having elastic auxiliary warp threads at the selvages, said elastic auxiliary warp threads drawing the fabric into circular shape, the said selvages forming the inner face of the body, pucker resisting means between said selvages, water-proofing means saturating the said textile body while the latter is held stretched on a form to render the fabric tubular and circular in shape and to hold the said auxiliary warp threads against stretching, fastening means adapted to fasten the selvages together, and fastening means adapted to fasten the ends of the body together.

3. The herein described method of producing a covering for a vehicle tire and like circular article, which consists in weaving a flat piece of fabric with elastic auxiliary warp threads at the selvages and held under tension during the weaving, doubling up the weave in a longitudinal direction, the longitudinal central portion of the fabric resisting puckering when so doubled up and relaxing the said elastic auxiliary warp threads for the latter to draw the fabric into circular shape, fashioning the weave over a circular form, and saturating the weave with a water-proofing material to render the covering waterproof and to hold the elastic auxiliary warp threads against stretching.

4. The herein described method of producing a covering for a vehicle tire and like circular article, which consists in weaving a flat piece of fabric with elastic auxiliary warp threads at the selvages and held under tension during the weaving, doubling up the weave in a longitudinal direction, the longitudinal central portion of the fabric resisting puckering when so doubled up and relaxing the said elastic auxiliary warp threads whereby they may draw the fabric into circular shape, fashioning the weave over a circular form with the selvages inmost, and saturating the weave with a waterproofing material which will render the covering waterproof and hold the elastic warp threads against stretching.

WILLIAM ACHTMEYER.

Copies of this patent may be obtained for five cents each, by addressing the "Commissioner of Patents, Washington, D. C."